(12) United States Patent
Lepak

(10) Patent No.: US 12,131,063 B2
(45) Date of Patent: Oct. 29, 2024

(54) METHODS AND APPARATUS FOR OFFLOADING TIERED MEMORIES MANAGEMENT

(71) Applicant: Advanced Micro Devices, Inc., Santa Clara, CA (US)

(72) Inventor: Kevin M. Lepak, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/219,138

(22) Filed: Mar. 31, 2021

(65) Prior Publication Data

US 2022/0317925 A1 Oct. 6, 2022

(51) Int. Cl.
*G06F 3/00* (2006.01)
*G06F 3/06* (2006.01)
*G06F 12/0882* (2016.01)
*G06F 12/1009* (2016.01)

(52) U.S. Cl.
CPC .......... *G06F 3/0659* (2013.01); *G06F 3/0619* (2013.01); *G06F 3/0647* (2013.01); *G06F 3/0679* (2013.01); *G06F 12/0882* (2013.01); *G06F 12/1009* (2013.01)

(58) Field of Classification Search
CPC .... G06F 3/0683; G06F 3/0685; G06F 3/0659; G06F 3/0647; G06F 12/1009
See application file for complete search history.

(56) References Cited

U.S. PATENT DOCUMENTS

| | | | |
|---|---|---|---|
| 11,620,233 B1 * | 4/2023 | Habusha | G06F 12/0891 |
| | | | 711/207 |
| 2011/0271070 A1 * | 11/2011 | Worthington | G06F 3/0688 |
| | | | 711/E12.001 |
| 2014/0040698 A1 | 2/2014 | Loh et al. | |
| 2018/0046378 A1 | 2/2018 | Coburn et al. | |
| 2020/0125490 A1 * | 4/2020 | Blagodurov | G06F 3/061 |
| 2022/0237126 A1 * | 7/2022 | Woo | G06F 12/0882 |

FOREIGN PATENT DOCUMENTS

WO 2022212081 A1 10/2022

OTHER PUBLICATIONS

International Search Report and Written Opinion, PCT/US2022/020828, Jun. 29, 2022, 10 pages.

* cited by examiner

*Primary Examiner* — Reginald G Bragdon
*Assistant Examiner* — Michael L Westbrook

(57) ABSTRACT

Methods and apparatus offload tiered memories management. The method includes obtaining a pointer to a stored memory management structure associated with tiered memories, where the memory management structure includes a plurality of memory management entries and each memory management entry of the plurality of memory management entries includes information for a memory section in one of the tiered memories. In some instances, the method includes scanning at least a part of the plurality of memory management entries. In certain instances, the method includes generating a memory profile list, where the memory profile list includes a plurality of profile entries and each profile entry of the plurality of profile entries corresponding to a scanned memory management entry in the memory management structure.

25 Claims, 5 Drawing Sheets

METHODS AND APPARATUS FOR OFFLOADING TIERED MEMORIES MANAGEMENT

BACKGROUND

Memory controllers, including direct memory access (DMA) controllers, are circuits that translate accesses generated by a memory accessing agent such as a data processor into one or more commands that are understood by computer memory. A memory controller can be implemented as a separate chip or integrated with other components such as data processors on a single integrated circuit chip. In the latter case, the memory controller is usually called an integrated memory controller. Integrated memory controllers support various bus protocols, such as the dynamic random-access memory (DRAM) bus protocol and the double data rate dynamic random-access memory (DDR DRAM) bus protocol. The need for tight coupling of memory with computing resources like processors such as central processing units (CPUs), graphics processing units (GPUs), digital signal processors (DPSs), and the like pose challenges to the system designer related to memory capacity requirements, memory controller availability, memory lifecycle limitations, and memory bandwidth availability to CPUs. Capabilities such as in-memory workloads and server virtualization drive the need for increasing memory capacity. Moreover, the increasing performance of CPUs (e.g., one or more cores) creates a need for more memory channels per socket. For example, memory capacity requirements are driven by the number of CPUs in order to maintain balanced computational resources for many workloads.

In an effort to address these evolving needs, designers have developed new types of memory and memory systems. For example, one new type of memory known as storage class memory (SCM) uses dual inline memory modules (DIMMs), which is similar to standard DDR DRAM, but uses a NAND flash or other phase change memory as a backing store and DRAM as a local cache for active data. Tiered memories refer to memories having various memory access speeds and/or memory spaces. For example, one tier of memory includes memory that has a faster bus transfer rate than another tier. As another example one tier may have a smaller memory space than another tier Such a DIMM module can be attached using the JEDEC ("Joint Electron Device Engineering Council") NVDIMM-P ("non-volatile dual in-line memory module-persistent") standard which leverages the existing DDR DRAM bus but allows new memory types to be placed on this bus that are structured differently than conventional DDR DRAMs.

In existing x86 systems, the "Accessed" and "Dirty" bits (A/D bits) in a particular operating system and/or hypervisor (OS/HV) page table are updated by hardware, either the x86 CPU or the IOMMU (input-output memory management unit) in the case of I/O accesses, when a particular page of memory is accessed or written. Some OS paging algorithms periodically reset these A/D bits and then look at which ones are set and clear periodically to evaluate a particular piece of memory is "hot" (accessed frequently) or "cold" (infrequently). However, such OS paging algorithms do the evaluation with x86 CPU cores and they do it very slowly and/or "on demand" only (when they are "out of memory" and need to page something out). In this case, the OS paging algorithms are using x86 CPUs to scan (i.e., crawl) the page table, but such scanning only scan all of DRAM every 30-120 seconds for current DRAM sizes. Such approach would not scale performance-wise for a much larger capacity tiered memory system, for example, a second-tier memory being 8 times larger than the DRAM.

Additionally, while CPU processor cores are used to periodically walk the page tables or the like to find hot memory pages and/or cold memory pages, however, this takes precious resources away from the CPU processor cores to run software codes (e.g., applications, software programs).

Furthermore, types of fabric memory systems are emerging that leverage these new memory interconnect standards and interfaces. One new type of memory system, known as GenZ, uses a standard interface protocol between processors and media in a communication fabric to support both directly attached memory and multiple levels of fabric attached remote memory of different types.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF EMBODIMENTS

Figure 1:
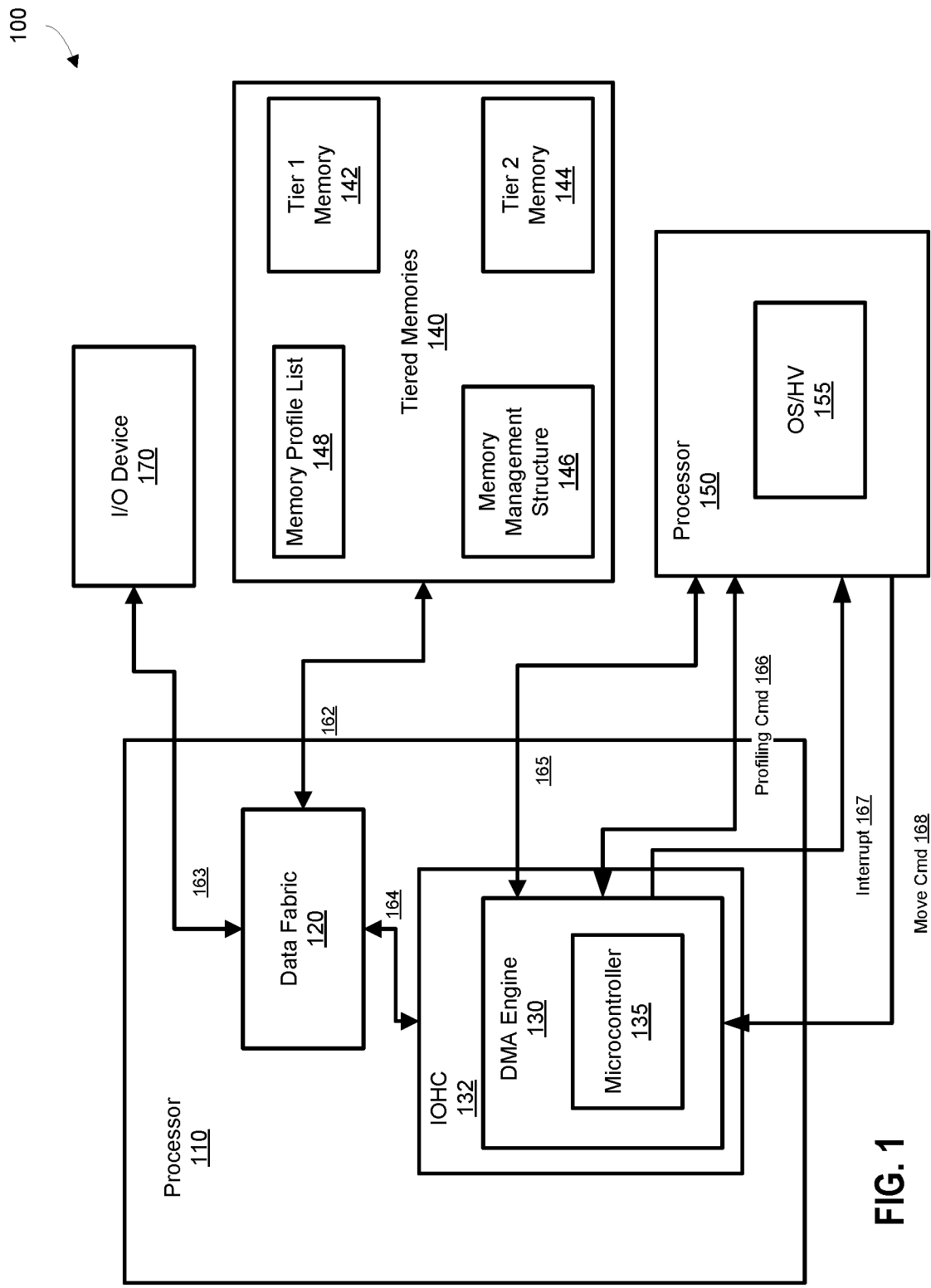
FIG. 1 is a schematic block diagram illustrating a computing architecture for managing data in tiered memories in accordance with certain implementations set forth in the disclosure.

The present disclosure generally relates to, among other things, methods and apparatus for offloading management of at least a part of tiered memories. In some examples, tiered memories refer to memories having various memory access speeds and/or memory spaces. When computing processors and/or input/output (I/O) device touches (e.g., accesses, reads, modifies, deletes) certain types of memories and tiered memories, memory management data structures (e.g., page tables) are automatically updated. As used herein, computing processors refer to processors executing software code. In some implementations, memory controllers offload at least a part of memory management from the computing processors. In some examples, memory controllers scan these memory management structures to compile a memory profile list and provides the memory profile list to a computing processor.

In some variations, a memory controller, includes one or more of an integrated memory controller, non-integrated memory controller, or direct memory access (DMA) controller, and scans a page table having memory assignment and usage information across memory pages of multiple tiered memories and generates a page profile list including page profile information of memory pages in the tiered memories. As used herein, an integrated memory controller refers to a memory controller integrated with a processor on an integrated circuit chip. In some examples, the integrated memory controller is integrated with a data processor that does not run operating system, hypervisor, and/or software application (OS/HV/Application). In certain examples, a processing system has some central processing unit (CPU) cores that can run OS/HV/Application, and many supporting processing units (e.g., data fabric, DMA controllers, other microcontrollers), which may or may not be physically integrated into the same chip (e.g., system-on-a-chip (SOC)) as the CPU cores, while these supporting processing units cannot be used to run OS/HV/Application. In some examples, the memory controller is a separate circuit chip that offloads at least a part of memory management from a computing processor such as a main central processing unit (CPU). In certain examples, the memory controller identifies hot memory pages on a slow-tiered memory and, either automatically or under command, moves or copies such hot memory pages to a fast-tiered memory. In one example, the memory controller is a DMA controller, or referred to as a DMA engine.

There are various memory interface standards for attaching non-conventional memories, such as SCM and fabric memory systems, to computer systems. In some implementations, these standards allow different types of memory to be directly-addressed by the application code running on a CPU (e.g., load, store, etc.) and do not require block-based (e.g., disk-like) storage interfaces (e.g., PCIe ("Peripheral Component Interconnect Express") or SATA-like ("Serial Advanced Technology Attachment")). In effect, the memories are logically equivalent to conventional DRAM in how CPUs and computing processors access them. The memory access latency, bandwidth, and other performance-centric properties may differ, in some cases substantially. Some memory interface standards, including JEDEC NVDIMM-P standard and compute express link (CXL) standard, allow memory devices to be attached using a differential serializer/deserialize (SerDes) link.

Tiered memories can be managed transparently or non-transparently. In a transparently managed system, a single memory space is represented to the operating system and/or hypervisor (OS/HV). This requires an additional hardware level translation and/or caching/tracking mechanisms. In a non-transparently managed system, the tiered memories are managed by the OS/HV (e.g., via existing non-uniform memory access (NUMA) styled memory topology reporting mechanisms) using memory management structures (e.g., page tables). In some implementations, OS/HV is responsible for optimizing application memory placement utilizing the existing paging mechanisms.

Some embodiments of the present disclosure are directed to methods and apparatus for memory management for a non-transparent memory system. In one example, tiered memories include a first-tier memory of DRAM and a second-tier memory attached using one of the standard interfaces (e.g., NVDIMM-P or CXL). Some examples of second-tier memory can include phase change memories, phase-change-like memories, SCM, legacy DRAM technologies behind a CXL memory buffer chip to enable re-using reclaimed DRAM from legacy systems with CPUs, and the like. In one example, the second-tier memory can be a fabric memory that supports dynamic reassignment of memory capacity between multiple host systems based on their target application memory needs.

In certain implementations, a method implemented by a memory controller, includes obtaining a pointer to a stored memory management structure associated with tiered memories, where the memory management structure includes a plurality of memory management entries and each memory management entry of the plurality of memory management entries includes information for a memory section in one of the tiered memories. In some instances, the method includes scanning at least a part of the plurality of memory management entries. In certain instances, the method includes generating a memory profile list, where the memory profile list includes a plurality of profile entries and each profile entry of the plurality of profile entries corresponding to a scanned memory management entry in the memory management structure.

In some examples, the method includes receiving a profiling command to generate the memory profile list and scanning at least a part of the plurality of memory management entries after receiving the profiling command. In some instances, the profiling command includes at least one of the pointer to the stored memory management structure, a memory range of one of the tiered memories, and a match criteria. In certain instances, the match criteria includes a criteria mask indicating a portion of each memory management entry of the plurality of memory management entries to be evaluated and a criteria value indicating a predetermined value of the portion of the memory management entry.

In some examples, the portion of each memory management entry includes at least one of an access bit and a dirty bit. In some instances, the memory profile list includes a first list of one or more hot memory pages in a second-tier memory of the tiered memories that has a slower memory access speed than a first-tier memory of the tiered memories. In certain instances, the memory profile list includes a second list of one or more cold memory pages in the first-tier memory.

In certain examples, the method includes obtaining, by the memory controller, a memory location for the memory profile list; storing, by the memory controller, the memory profile list at the memory location; and transmitting, by the memory controller, an indication of the memory profile list being generated. In some instances, the method includes receiving a move command; and migrating at least one hot memory page in the second-tier memory to the first-tier memory. In some instances, each profile entry of the plurality of profile entries includes a memory management entry of a corresponding memory section.

In some implementations, an integrated circuit includes a memory controller and the memory controller obtains a pointer to a stored memory management structure associated with tiered memories, where the memory management structure includes a plurality of memory management entries and each memory management entry of the plurality of memory management entries includes information for a memory section in one of the tiered memories. In some instances, the memory controller scans at least a part of the plurality of memory management entries; and generates a memory profile list, the memory profile list includes a plurality of profile entries, where each profile entry of the plurality of profile entries is corresponding to a scanned memory management entry in the memory management structure.

In some examples, the memory controller receives a profiling command to generate the memory profile list and scans at least a part of the plurality of memory management entries after receiving the profiling command. In some instances, the profiling command includes at least one of the pointer to the stored memory management structure, a memory range of one of the tiered memories, and a match criteria. In some variations, the match criteria includes a criteria mask indicating a portion of each memory management entry of the plurality of memory management entries to be evaluated and a criteria value indicating a predetermined value of the portion of the memory management entry. In some instance, the portion of each memory management entry includes at least one of an access bit and a dirty bit.

In certain examples, the memory profile list includes a first list of one or more hot memory pages in a second-tier memory of the tiered memories that has a slower memory access speed than a first-tier memory of the tiered memories. In some instances, the memory profile list includes a second list of one or more cold memory pages in the first-tier memory.

In some examples, the memory controller obtains a memory location for the memory profile list; stores the memory profile list at the memory location; and transmits an indication of the memory profile list being generated. In some instances, the memory controller receive a move command; and migrates at least one hot memory page in the second-tier memory to the first-tier memory. In some variations, each profile entry of the plurality of profile entries includes a memory management entry of a corresponding memory section. In some implementations, the integrated circuit includes: a first processor including the memory controller, data fabric operatively coupled to the memory controller, and a second processor configured to interface with the tiered memories.

In certain implementations, a system includes tiered memories configured to store application data, a processor configured to run an application, and a memory controller operatively coupled to the tiered memories. In some instances, the memory controller receives a pointer to a page table from the processor, where the page table includes a plurality of page table entries, each page table entry includes page information for a page in the tiered memories. In some variations, the memory controller scans at least a part of the plurality of page table entries in the page table and generates a page profile list, where the page profile list includes a plurality of profile entries and each profile entry of the plurality profile entries corresponding to a scanned page table entry in the page table.

In some examples, the memory controller receives a profiling command to generate the memory profile list, and scans at least a part of the plurality of memory management entries after receiving the profiling command. In some instances, the profiling command includes at least one of the pointer to the stored memory management structure, a memory range of one of the tiered memories, and a match criteria. In some variations, the match criteria includes a criteria mask indicating a portion of each memory management entry of the plurality of memory management entries to be evaluated and a criteria value indicating a predetermined value of the portion of the memory management entry. In certain variations, the portion of each memory management entry includes at least one of an access bit and a dirty bit.

In certain examples, the memory profile list includes a first list of one or more hot memory pages in a second-tier memory of the tiered memories that has a slower memory access speed than a first-tier memory of the tiered memories. In some instances, the memory profile list includes a second list of one or more cold memory pages in the first-tier memory.

In some examples, the memory controller obtains a memory location for the memory profile list; stores the memory profile list at the memory location; and transmits an indication of the memory profile list being generated. In some instances, the memory controller receives a move command; and migrates at least one hot memory page in the second-tier memory to the first-tier memory. In some variations, each profile entry of the plurality of profile entries includes a memory management entry of a corresponding memory section.

In some implementations, an integrated circuit includes a memory controller coupled to tiered memories and obtains a pointer to a stored memory management structure associated with the tiered memories, where the memory management structure includes a plurality of memory management entries and each memory management entry of the plurality of memory management entries includes information for a memory section in one of the tiered memories. In some instances, the memory controller scans at least a part of the plurality of memory management entries; and generate a memory profile list, where the memory profile list includes a plurality of profile entries and each profile entry of the plurality of profile entries is corresponding to a scanned memory management entry in the memory management structure.

In some examples, the memory controller receive a profiling command to generates the memory profile list and scans at least a part of the plurality of memory management entries after receiving the profiling command. In some instances, the profiling command includes at least one of the pointer to the stored memory management structure, a memory range of one of the tiered memories, and a match criteria.

In some variations, the match criteria includes a criteria mask indicating a portion of each memory management entry of the plurality of memory management entries to be evaluated and a criteria value indicating a predetermined value of the portion of the memory management entry.

In certain examples, the portion of each memory management entry includes at least one of an access bit and a dirty bit. In some instances, the memory profile list includes a first list of one or more hot memory pages in a second-tier memory of the tiered memories that has a slower memory access speed than a first-tier memory of the tiered memories. In some variations, the memory profile list includes a second list of one or more cold memory pages in the first-tier memory.

In some examples, the memory controller obtains a memory location for the memory profile list; stores the memory profile list at the memory location; and transmits an indication of the memory profile list being generated. In some instances, the memory controller receives a move command; and migrates at least one hot memory page in the second-tier memory to the first-tier memory. In some variations, each profile entry of the plurality of profile entries includes a memory management entry of a corresponding memory section.

FIG. 1 is a schematic block diagram illustrating a computing system 100 for managing data in tiered memories in accordance with certain implementations set forth in the disclosure. In some implementations, the computing system 100 is implemented by any type of computing device suitable for implementing aspects of embodiments of the disclosed subject matter. Examples of computing devices include but are not limited to laptops, desktops, tablet computers, hand-held devices, display devices, media players, televisions, game consoles, printers, servers, cloud computing platforms, integrated circuits and the like, all of which are contemplated within the scope of FIG. 1, with reference to various components of the computing device 100.

In some examples, the computing system 100 includes a data processor 110, tiered memories 140, a computing processor 150 (e.g., a central processing unit (CPU), a graphical processing unit (GPU), a digital signal processor (DSP), etc.), and one or more I/O devices 170. Any number of additional components, different components, and/or combinations of components is also included in the computing system 100. One or more of the components are optional to the computing system 100. In some examples, each tier memory of the tiered memories is a directly addressable memory.

In some implementations, the computing system 100 includes one or more address buses and/or data buses (e.g., 162, 163, 164, 165, etc.) that, directly and/or indirectly, couple various components of the computing device 100. In some designs, any number of the components of computing device 100, or combinations thereof, may be distributed and/or duplicated across a number of computing devices. In some variations, the computing system 100 includes any number of processors (e.g., CPUs, GPUs, etc.). For example, in one variation, the computing system 100 includes a data processor 110 and a computing processor 150. In some variations, the computing system 100 includes a plurality of data processors and/or computing processors. As used herein, a processor refers to one or more CPUs, GPUs, GPGPUs, APUs, and/or other processing units. In some implementations, the processor 110 and/or the processor 150 are a part of many interconnected processors through ports and other communication links in a server system managed by a hypervisor to provide a virtualized processing system (e.g., guest machines, virtual machines).

In some implementations, the processor includes a data fabric 120 and an input/output host controller (IOHC) 132. In some variations, the data fabric 120 facilitates accesses, reads, writes, allocations, moves, copies and other data functions associated with the tiered memories 140 via communication links 162. In some examples, the data fabric 120 includes one or more data fabric components. In some variations, the IOHC 132 includes a direct memory access (DMA) controller 130, also referred to as a DMA engine 130, which is coupled to the data fabric 120. In some examples, the DMA engine 130 includes a microcontroller 135 to perform memory management functionality for I/O device 170 that can access the tiered memory as opposed to, for example, processor cores of processor 150. In some variations, the one or more I/O devices 170 are coupled to the data fabric 120 via communication links 163.

In some implementations, the computing system 100 includes the computing processor 150. In one example, the computing processor 150 is an x86 CPU. In some variations, the computing processor 150 includes an operating system and/or a hypervisor (OS/HV) 155. In some variations, the computing processor 150 sends and receives commands, data, and/or signals from and to the DMA engine 130 via the communication link 165. In some examples, the computing processor 150 sends a profiling command 166 to the DMA engine 130. In some examples, the profiling command 166 includes an address and/or a pointer to a memory management structure (e.g., page table) 146. In one example, the profiling command 166 includes an address and/or a point to a memory profile list 148.

In some implementations, the computing system 100 includes the tiered memories 140, which include a first-tier memory 142 and a second-tier memory 144. In some examples, the first-tier memory 142 has a faster access speed than the access speed of the second-tier memory 144. In some examples, the first-tier memory 142 has a smaller memory space than the memory space of the second-tier memory 144. In one example, the first-tier memory 142 is a DRAM. In one example, the second-tier memory 144 is a storage-class memory (SCM).

In some implementations, the tiered memories 140 include a memory management structure (e.g., page table) 146. In some variations, the memory management structure 146 is a page table including a plurality of page table entries, where each page table entry (PTE) includes page information for a memory page. In some examples, the page information includes one or more of a physical address, a virtual address, an access bit (A bit), a dirty bit (D bit), and other memory page information. In some variations, the computing processor 150 provides the address and/or pointer to the memory management structure (e.g., page table) 146 in the profiling command 166. In one example, the page information includes an access bit indicating whether a corresponding page is accessed during a predetermined time period. In one example, the page information includes a dirty bit (e.g., a modified bit) indicating whether a corresponding page is written during a predetermined time period.

In some examples, processors and/or input/output (I/O) devices, depending on system architecture, access the page tables (e.g., memory management structure (e.g., page table) 146), as a part of normal operation to translate from a virtual address to a physical address (actual memory location). Other address translations can be used, for example, from host physical addresses to system physical addresses. As used herein, a virtual address includes a guest physical address or a host physical address. These translation/paging mechanisms allow a computer system to host multiple virtual machines (VMs) and to run multiple programs simultaneously that have private (i.e., program-level view) of memory but utilizing different regions of physical memory. These translations are commonly cached in structures like translation lookaside buffers (TLBs) to speed up access. In some examples, these translation tables are used to keep track of when a page is accessed or written. This information can be leveraged to inform tiered memory management to determine hot and cold memory pages.

In some implementations, the tiered memories 140 include a memory profile list 148 (e.g., page profile list) that is generated by the DMA engine 130. In some implementations, in response to the profiling command 166 from a hypervisor or OS, the DMA engine 130 starts to scan the memory management structure 146 and generate the memory profile list 148. In some examples, the DMA engine 130 scans the memory management structure 146 in a predetermined frequency, where each scan is also referred to as a profiling cycle. In some variations, the DMA engine 130 scans the memory management structure 146 with a frequency higher than once per five (5) seconds, either based upon received profiling commands or based upon a predefined frequency. In some variations, the DMA engine 130 scans the memory management structure 146 with a frequency higher than once per one (1) second, either based upon received profiling commands or based upon a predefined frequency. In one example, the DMA engine 130 scans the memory management structure 146 once with the profiling command 166 received from the computing processor 150. In some implementations, the DMA engine 130 scans a part or all of the page table entries in the memory management structure (e.g., page table) 146. In some variations, the DMA engine 130 reads the access bits and/or the dirty bits in the page table entries to determine whether a corresponding memory page is accessed.

In certain implementations, the DMA engine 130 provides a special code/interface with the processor 150 (e.g., a CPU) that understands the x86 page table format. In some variations, the DMA engine 130 is given a simple pointer (or otherwise) description of "which page table to walk" and returns, for example, a list of pages with the "A bit" set. The DMA engine 130 can be further informed with a memory range defining the first-tier memory 142 and/or the second-tier memory 144 so that it only finds hot pages in the second-tier memory 144. In some variations, most pages in the second-tier memory 144 are not expected to be "hot", so this scanning process may look at a lot of PTEs (page table entries) with most of them being uninteresting, for example, the access bit and/or the dirty bit clear indicating that they have not been used "recently". In certain variations, the DMA engine 130 includes one or more small microcontrollers (e.g., microcontrollers 135) so they can execute simple programs.

In some implementations, the memory profile list 148 includes one or more memory management entries. In some examples, the memory management entries are from the memory management structure 146, which includes page tables. In one example, the memory management entries are from the memory management structure 146 that is different from a page table structure. In some variations, the memory profile list 148 includes a list of hot memory pages in the second-tier memory 144. As used herein, a hot memory page, also referred to as a hot page, is a memory page being accessed more often than a predetermined threshold, and/or a page being accessed within a predetermined time period. In some variations, the memory profile list 148 includes a list of cold memory pages in the first-tier memory 142. As used herein, a cold memory page, also referred to as a cold page, is a memory page being accessed less often than a predetermined threshold, and/or a page not being accessed within a predetermined time period. In some examples, the memory profile list 148 includes a plurality of memory profile entries, where each memory profile entry corresponds to a scanned memory management entry in the memory management structure. In certain examples, a memory profiling entry is a page profile entry including an indication of whether a corresponding memory page is a hot memory page.

In certain implementations, the profiling command 166 includes an address range for each tier of memory in the tiered memories. In some cases, the profiling command 166 includes a first address range that is corresponding to the physical address range of the first-tier memory and a second address range that is corresponding to the physical address range of the second-tier memory. In some examples, the DMA engine 130 scans the memory management structure (e.g., page table) 146 and determines the specific tier memory (e.g., first-tier memory, second-tier memory) with which each scanned memory management entry is associated based at least in part upon the address ranges. While some examples in the present disclosure are using two tiered memories, the memory profiling approach can be used in three or more tiered memories.

In some examples, the DMA engine 130 scans only the memory management entries (e.g., PTEs) associated with memory pages in a certain tier memory (e.g., first-tier memory, second-tier memory, etc.). In some examples, the DMA engine 130 scans all the memory management entries (e.g., PTEs). In certain examples, the DMA engine 130 generates the memory profile list 148 for a certain tier memory (e.g., first-tier memory, second-tier memory, etc.). In some examples, the DMA engine 130 generates the memory profile list 148 for a specific type of page in a certain tier memory (e.g., hot page list in the second-tier memory, cold page list in the first-tier memory, etc.). In certain examples, the DMA engine 130 generates the memory profile list 148 for all memory pages in a certain tier memory with indications of whether a corresponding memory page is hot or cold. In some examples, the DMA engine 130 generates the memory profile list 148 for a specific type of page in one of the tiered memories and all memory pages in another one of the tiered memories. For example, the memory profile list 148 includes a list of hot memory pages in the second-tier memory and all memory pages in the first-tier memory. In certain examples, the page profiling command 166 includes information indicating what type of page profile list should be generated and/or what information should be included in the page profile list.

In some implementations, the DMA engine 130 stores the memory profile list 148 (e.g., page profile list) at the address and/or the pointer of the memory profile list 148. After the memory profile list 148 is generated and/or updated, the DMA engine 130 sends an interrupt 167 to the computing processor 150, indicating a completion of memory profiling. In some implementations, the computing processor 150 sends a move command 168 (e.g., page move command) to the DMA engine 130. In one example, the DMA engine 130 migrates a part or all hot memory pages in the second-tier memory 144 to the first-tier memory 142, via the data fabric 120. In one example, the DMA engine 130 migrates a part or all cold memory pages in the first-tier memory 142 to the second-tier memory 144, via the data fabric 120.

In some variations, a part of or all components of the data processor 110 are combined into a single integrated circuit (IC). In certain variations, all components of the data processor 110 are combined into a single integrated circuit (IC). In some variations, one or more components of the data processor 110 (e.g., a part of the data fabric 120) is implemented on a separate IC. In some variations, a part of or all components of the data processor 110 and a part of or all components of the computing processor 150 are combined into a single IC. In certain variations, a part of or all components of the data processor 110 and a part of or all components of the tiered memory 140 are combined into a single IC.

Figure 2:
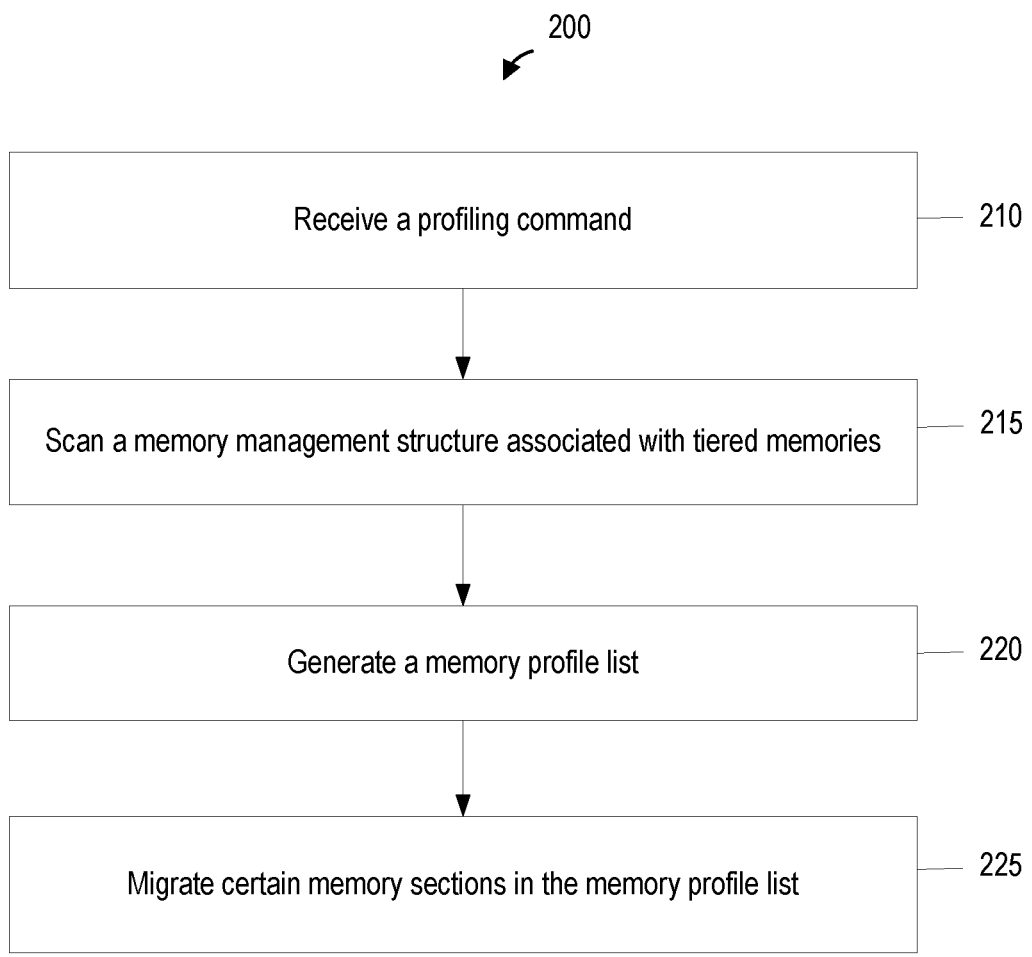
FIG. 2 is a flowchart illustrating one example of a method for offloading tiered memories management in accordance with certain implementations set forth in the disclosure.

FIG. 2 is a flowchart illustrating one example of a method 200 for offloading tiered memories management in accordance with certain implementations set forth in the disclosure. Aspects of embodiments of the method 200 are performed, for example, by a computing device (e.g., a device implementing the computing system 100 in FIG. 1) or a memory controller (e.g., the DMA engine 130 in FIG. 1). In some implementations, one or more steps of method 200 are optional and/or modified by one or more steps of other embodiments described herein. In some implementations, one or more steps of other embodiments described herein are added to the method 200. In this example, the memory controller receives a profiling command (210) (e.g., page profiling command), for example, to conduct memory profiling to tiered memories. In some variations, the profiling command is sent from an operating system and/or a hypervisor (OS/HV) of a CPU to offload the memory profiling from the CPU.

In some variations, the profiling command includes a pointer, a memory location, and/or an address of the page table (e.g., memory management structure 146 in FIG. 1) associated with tiered memories. In certain variations, the profiling command includes address ranges of respective tiered memories. For example, the profiling command includes a first address range (e.g., address 0000-0100 etc.) of the first-tier memory and a second address range (e.g., address 0101-0999, etc.) of the second-tier memory. In some examples, the first-tier memory has a faster access speed than the access speed of the second-tier memory. In some examples, the first-tier memory has a smaller memory space than the memory space of the second-tier memory. In one example, the first-tier memory is a DRAM. In one example, the second-tier memory is a storage-class memory (SCM).

In some examples, the memory management structure is a page table including a plurality of page table entries, where each page table entry includes page information for a memory page or a memory section in the tiered memories. In some examples, the page information includes one or more of physical address, virtual address, access bit, dirty bit (e.g., modified bit), and other memory page information. In certain variations, the profiling command includes a pointer, a memory location, and/or an address of a memory profile list (e.g., memory profile list 148 in FIG. 1).

In some implementations, the memory controller scans the memory management structure associated with tiered memories (215). In some examples, the memory controller scans the memory management structure (e.g., page table) in a predetermined frequency. In one example, the memory controller (e.g., an integrated memory controller, a DMA engine/controller, etc.) scans the memory management structure once with each profiling command received from the OS/HV of the CPU. In some variations, the memory controller (e.g., a DMA engine/controller, etc.) scans the memory management structure with a frequency higher than once per five (5) seconds. In some variations, the memory controller (e.g., a DMA engine/controller, etc.) scans the memory management structure with a frequency higher than once per one (1) second. In some implementations, the memory controller (e.g., a DMA engine/controller, etc.) scans a part or all of the memory management structure. In some variations, the memory controller (e.g., a DMA engine/controller, etc.) reads the access bits and/or the dirty bits in the page table entries to determine whether a corresponding memory page is accessed.

In some implementations, the memory controller generates a memory profile list (e.g., the memory profile list 148 in FIG. 1) associated with the memory management structure (e.g., page table) and corresponding memory pages in the tiered memories. In some variations, the memory profile list is a page profile list including a list of hot memory pages in the second-tier memory (e.g., a memory with a slower memory access speed, SCM, etc.). In certain variations, the memory profile list is a page profile list including a list of cold memory pages in the first-tier memory (e.g., a memory with a faster memory access speed, DRAM, etc.). In some examples, the memory profile list includes a plurality of memory profile entries, where each memory profile entry corresponds to a scanned memory management structure entry in the memory management structure. In certain examples, each memory profile entry is a page profile entry including an indication of whether a corresponding memory page is a hot memory page.

In certain implementations, the profiling command received by the memory controller includes address ranges of corresponding tiered memories. For example, the profiling command includes a first address range that is corresponding to the physical address range of the first-tier memory and a second address range that is corresponding to the physical address range of the second-tier memory. In some examples, the memory controller (e.g., an integrated memory controller, a DMA engine/controller, etc.) scans the page table and determines the specific tier memory (e.g., first-tier memory, second-tier memory) with which each scanned page table entry is associated. While some examples in the present disclosure are using two tiered memories, the page profiling approach can be used in three or more tiered memories.

In some examples, the memory controller (e.g., an integrated memory controller, a DMA engine/controller, etc.) scans only the memory management entries in the memory management structure associated with memory pages in a certain tier memory (e.g., first-tier memory, second-tier memory, etc.). In some examples, the memory controller scans all the page table entries. In certain examples, the memory controller generates the page profile list for a certain tier memory (e.g., first-tier memory, second-tier memory, etc.). In some examples, the memory controller generates the page profile list for a specific type of page in a certain tier memory (e.g., hot page list in the second-tier memory, cold page list in the first-tier memory, etc.).

In certain examples, the memory controller generates the memory profile list for all memory pages in a certain tier memory with indications of whether a corresponding memory page is hot or cold. In some examples, the memory controller generates the memory profile list (e.g., page profile list) for a specific type of pages in one of the tiered memories and all memory pages in another one of the tiered memories. For example, the memory profile list includes a list of hot memory pages in the second-tier memory and all memory pages in the first-tier memory. In some implementations, the profiling command includes certain match criteria, which specify the types of pages to be scanned and/or included in the memory profile list. In some examples, the memory controller scans only the memory management entries as specified in the profiling command. In certain examples, the profiling command includes information indicating what type of page profile list should be generated and/or what information should be included in the page profile list.

In some implementations, the memory controller (e.g., a DMA engine/controller, etc.) stores the memory profile list at the address and/or the pointer of the page profile list, either provided in the profiling command or received from the CPU. After the memory profile list is generated and/or updated, the memory controller sends an interrupt to the CPU, indicating a completion of page profiling. In some variations, the memory controller receives a page move command from the CPU.

In some implementations, the memory controller migrates certain memory sections in the memory profile list (225). In some examples, the memory controller migrates certain memory pages in response to the page move command from the CPU. In certain examples, the memory controller migrates certain memory pages according to the page move command. In some examples, the memory controller migrates a part or all hot memory pages in the second-tier memory to the first-tier memory. In one example, the memory controller migrates a part or all cold memory pages in the first-tier memory to the second-tier memory.

Figure 3:
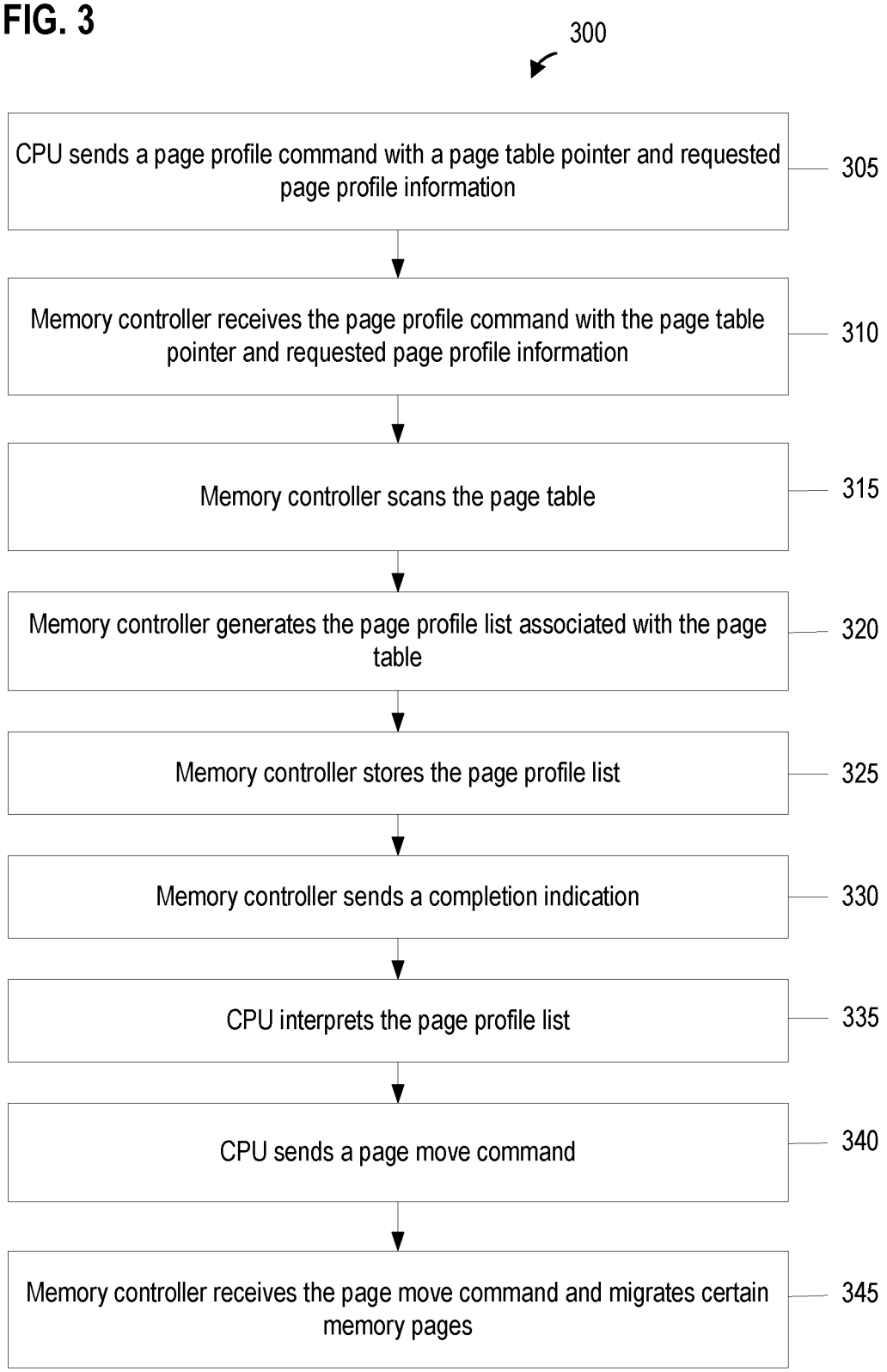
FIG. 3 is a flowchart illustrating one example of a method for offloading tiered memories management in accordance with certain implementations set forth in the disclosure.

FIG. 3 is a flowchart illustrating one example of a method 300 for offloading tiered memories management in accordance with certain implementations set forth in the disclosure. Aspects of the method 300 are performed, for example, by a computing device (e.g., a device implementing the computing system 100 in FIG. 1), a memory controller (e.g., an integrated memory controller, the DMA engine 130 in FIG. 1), a CPU (e.g., CPU 150 in FIG. 1). In some implementations, one or more steps of method 300 are optional and/or modified by one or more steps of other examples described herein. In some implementations, one or more steps of other examples described herein are added to the method 300. In some examples, CPU sends a page profile command (e.g., page profiling command 166 in FIG. 1) to a memory controller (305). In some variations, the page profile command is sent from an operating system and/or a hypervisor (OS/HV) of the CPU to offload the page profiling from the CPU. In this example, the page profile command includes a page table pointer and requested page profile information.

In some variations, the page profile command includes a pointer, a memory location, and/or an address of the page table (e.g., memory management structure (e.g., page table) 146 in FIG. 1) associated with tiered memories. In certain variations, the page profile command includes address ranges of respective tiered memories. For example, the page profile command includes a first address range (e.g., address 0000-0100 etc.) of the first-tier memory and a second address range (e.g., address 0101-0999, etc.) of the second-tier memory. In some examples, the first-tier memory has a faster access speed than the access speed of the second-tier memory. In some examples, the first-tier memory has a smaller memory space than the memory space of the second-tier memory. In one example, the first-tier memory is a DRAM. In one example, the second-tier memory is a storage-class memory (SCM).

In some examples, the page table includes a plurality of page table entries, where each page table entry includes page information for a memory page or a memory section in the tiered memories. In some examples, the page information includes one or more of physical address, virtual address, access bit, dirty bit (e.g., modified bit), and other memory page information. In certain variations, the page profile command includes a pointer, a memory location, and/or an address of a page profile list (e.g., memory profile list 148 in FIG. 1).

In certain implementations, the page profile command includes requested page profile information. For example, the requested page profile information includes the type of page list (e.g., cold memory page list, hot memory page list, or both, etc.), one or more specified tiered memories, access information, and/or the like. In some examples, the requested page profile information is a page profile list of hot memory pages in the second-tier memory. In certain examples, the requested page profile information is a page profile list of cold memory pages in the first-tier memory.

In some implementations, the memory controller (e.g., an integrated memory controller, a DMA engine/controller, etc.) receives the page profile command (310), for example, to conduct page profiling to tiered memories. In some variations, the memory controller accesses the page table via a data fabric (e.g., data fabric 120 in FIG. 1). In some examples, the memory controller scans the page table associated with tiered memories (315). In some examples, the memory controller scans the page table in a predetermined frequency. In one example, the memory controller scans the page table once with each profile command received from the OS/HV of the CPU. In some variations, the memory controller scans the page table with a frequency higher than once per five (5) seconds. In some variations, the memory controller scans the page table with a frequency higher than once per one (1) second. In some implementations, the memory controller scans a part or all of the page table entries in the page table. In some variations, the memory controller reads the access bits and/or the dirty bits in the page table entries to determine whether a corresponding memory page is accessed.

In some implementations, the memory controller generates a page profile list (e.g., the memory profile list 148 in FIG. 1) associated with the page table (320) and corresponding memory pages in the tiered memories. In some variations, the page profile list includes a list of hot memory pages in the second-tier memory (e.g., a memory with a slower memory access speed, SCM, etc.). In certain variations, the page profile list includes a list of cold memory pages in the first-tier memory (e.g., a memory with a faster memory access speed, DRAM, etc.). In some examples, the page profile list includes a plurality of page profiles, where each page profile of the plurality page profiles corresponding to a scanned page table entry in the page table. In certain examples, each page profile of the plurality page profiles includes an indication of whether a corresponding memory page is a hot memory page.

In certain implementations, the page profile command received by the memory controller includes address ranges of corresponding tiered memories. For example, the page profile command includes a first address range that is corresponding to the physical address range of the first-tier memory and a second address range that is corresponding to the physical address range of the second-tier memory. In some examples, the memory controller (e.g., a DMA engine/controller, etc.) scans the page table and determines the specific tier memory (e.g., first-tier memory, second-tier memory) with which each scanned page table entry is associated. While some examples in the present disclosure are using two tiered memories, the page profiling approach can be used in three or more tiered memories.

In some implementations, the memory controller generates the page profile list according the requested page profile information received from the CPU. In some examples, according to the requested page profile information, the memory controller (e.g., a DMA engine/controller, an integrated memory controller, etc.) scans only the page table entries associated with memory pages in a certain tier memory (e.g., first-tier memory, second-tier memory, etc.). In some examples, according to the requested page profile information, the memory controller scans all the page table entries. In certain examples, the memory controller generates the page profile list for a certain tier memory (e.g., first-tier memory, second-tier memory, etc.). In some examples, according to the requested page profile information, the memory controller generates the page profile list for a specific type of page in a certain tier memory (e.g., hot page list in the second-tier memory, cold page list in the first-tier memory, etc.).

In certain examples, the memory controller generates the page profile list for all memory pages in a certain tier memory with indications of whether a corresponding memory page is hot or cold. In some examples, the memory controller generates the page profile list for a specific type of page in one of the tiered memories and all memory pages in another one of the tiered memories. For example, the page profile list includes a list of hot memory pages in the second-tier memory and all memory pages in the first-tier memory. In certain examples, the page profile command includes information indicating what type of page profile list should be generated and/or what information should be included in the page profile list.

In some implementations, the memory controller (e.g., an integrated memory controller, a DMA engine/controller, etc.) stores the page profile list (325) at the address and/or the pointer of the page profile list, either provided in the page profile command or received from the CPU. After the page profile list is generated and/or updated, in some variations, the memory controller sends a completion indication to the CPU (330), which indicates a completion of the page profiling. In some examples, the completion indication is an indication of the page profile list being generated. In some examples, the completion indication is an interrupt to the CPU.

In certain implementations, after receiving the completion indication, the CPU retrieves the page profile list and interprets the page profile list (335). In some examples, the CPU evaluates the page profile list and selects certain memory pages for migration. In some examples, the CPU selects certain hot memory pages in the second-tier memory from the page profile list. In certain examples, the CPU selects certain cold memory pages in the first-tier memory from the page profile list. In some examples, the memory page selection is optional.

In some implementations, the CPU sends a page move command to the memory controller (340). In some examples, the page move command includes specific parameters, such as pages numbers, original addresses, target addresses, and/or other information. In certain examples, the page move command includes a request of moving all hot memory pages in the second-tier memory. In some examples, the memory controller (or the main processor core) performs a variety of functions to block and invalidate current page translations, copy data from source to destination pages and set up new page translations when the data movement is complete. In some examples, the memory controller (or the main processor core) performs a variety of functions to copy data from source to destination pages and provide intermediate page translations when the data movement is complete.

In some variations, the memory controller receives the page move command and migrates certain memory pages (345). In some examples, the memory controller migrates certain memory pages according to the page move command. In some examples, the memory controller migrates a part or all hot memory pages, which is in the page profile list, in the second-tier memory to the first-tier memory. In certain examples, the memory controller migrates certain hot memory pages, according to the page move command, in the second-tier memory to the first-tier memory. In some examples, the memory controller migrates a part or all cold memory pages in the first-tier memory to the second-tier memory. In some examples, the memory controller migrates certain cold memory pages, according to the page move command in the first-tier memory to the second-tier memory.

Figure 4:
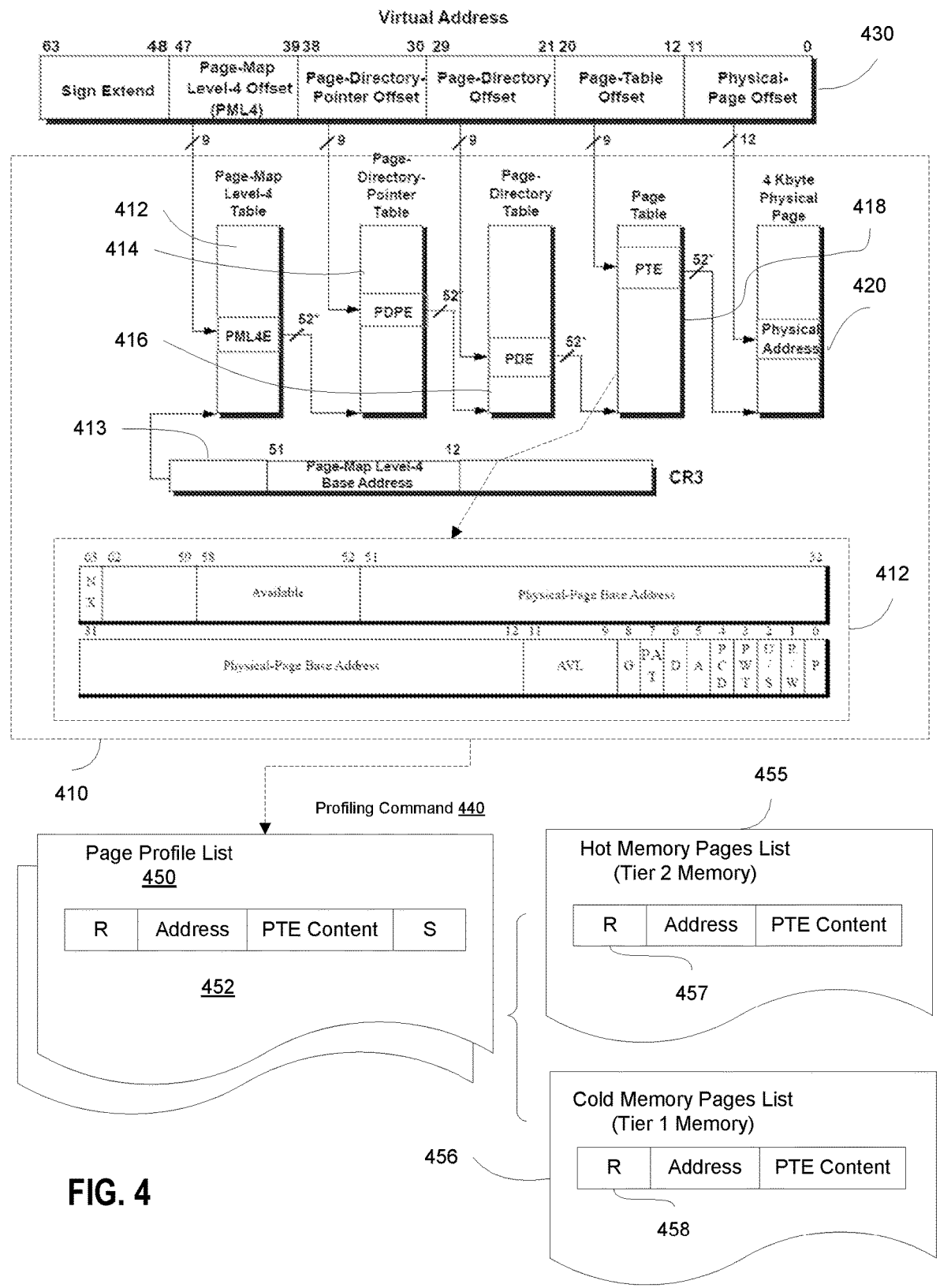
FIG. 4 is an illustrative example of a page table and a page profile list, in accordance with certain implementations set forth in the disclosure.

FIG. 4 is an illustrative example of a page table structure 410 for address translations and a page profile list 450, in accordance with certain implementations set forth in the disclosure. The page table structure 410, in this example, includes a set of hierarchical address-translation tables. The page table structure 410 translates a virtual address 430 to a physical address 420. The virtual address 430 has six fields, where four of the fields map to the page table structure 410, the physical-page offset field provides an address offset in a physical page 420, and the sign extend field is an additional field. The page table structure 410 includes a page-map level-4 table 412 that provides a mapping to the page-map level-4 offset field in the virtual address 430. The page table structure 410 includes a page-directory pointer table 414 that provides a mapping to the page-directory pointer offset field in the virtual address 430. The page table structure 410 includes a page-directory table 416 that provides a mapping to the page-directory offset field in the virtual address 430. The page table structure 410 includes a page table 418 that provides a mapping to the page table field in the virtual address 430. The page table structure 410 further includes a CR3 register (Control Register) 413 to point to page-map level-4 base address.

The page table structure 410 includes a plurality of page-table entries (PTEs) 412. In this example, the page table entry 412 includes the physical-page base address, "A" or access bit indicating whether the physical page has been accessed, and "D" or dirty bit indicating whether the physical page has been modified.

A memory controller (e.g., the DMA engine 130 in FIG. 1) receives a profiling command 440 to generate a page profile list 450. In some embodiments, the profiling command 440 is an example of the profiling command 166 illustrated in FIG. 1. In some examples, the page profile list 450 includes two or more lists 452. Table 1 illustrates one example of a profiling command 440, which includes multiple command fields. In this example, the profiling command includes the "Page Table Base" field that is the starting memory location of the page table structure (e.g., memory management structure 146 in FIG. 1, page table structure 410 in FIG. 4). The profiling command also includes the "Page Profile List Base" that provides the starting physical address to store the page profile list 450 and "Page Profile List Limit" that provides the ending physical address of the page profile list 450. The profiling command 440 further includes "Page Table Min" that provides starting virtual address (including virtual address or guest physical address) to be scanned and "Page Table Max" that provides the ending virtual address to be scanned. The two fields of "Page Table Min" and "Page Table Max" are optional. In some variations, the two fields of "Page Table Min" and "Page Table Max" can limit the number of scans and the completion time per profiling command for very large address spaces.

TABLE 1

| Field Name | Size | Description |
| --- | --- | --- |
| Page Table Base | 8 B | Starting memory location of the page table structure |
| Page Profile List Base | 8 B | Starting physical address to store Page Profile List |
| Page Profile List Limit | 8 B | Ending physical address of Page Profile List |
| Page Table Min | 8 B | Starting virtual address to scan |
| Page Table Max | 8 B | Ending virtual address to scan |
| System Physical Min[I] | 8 B | Lowest System Physical Address that identifies a tier "I" memory |
| System Physical Max[I] | 8 B | Highest System Physical Address that identifies a tier "I" memory |
| Match Criteria Mask[J] | 8 B | Criteria mask, e.g., set a bit to "1" if this entry in the PTE is part of the match |
| Match Criteria Value[J] | 8 B | Criteria value, e.g., Set the value of the required bits for Mask[J] |

In some implementations, the command fields of the profiling command 440 include "System Physical Min[I]" that provides the lowest system physical address that identifies the tier "I" memory (e.g., tier 1 memory, tier 2 memory) and "System Physical Max[I]" that provides the highest system physical address that identifies the tier "I" memory. The command fields further include "Match Criteria Mask[J]" that provides a description of a criteria J in the format of masked fields (e.g., fields to be scanned) and "Match Criteria Value [J]" that provides the required values for the masked fields in criteria J. For example, if the criteria J is to make access and dirty bits a part of the match (e.g., bit 6,5), Match Criteria Mask is set to 0x0000_0000_0000_0060; and to match only pages with "A" bits being set (e.g., with a value of 1) and "D" bits not set (e.g., with a value of 0), Match Criteria Value is set to 0x0000_0000_0000_0020.

Other match criteria can be added to the page profiling command 440. For example, the match criteria, or referred to as page profiling criteria, are to request particular pages being accessed in multiple profiling commands or iterations of profiling. As another example, the page profiling criteria are to request memory pages that have not been accessed in multiple profiling commands or iterations of profiling. As yet another example, the page profiling criteria are to request memory pages associated particular values of one or more bits in the PTE entry following a certain pattern and/or allocation.

In some implementations, the memory controller scans the page table structure 410 to generates the page profile list 450. In some examples, the page profile list 450 includes a plurality of page profile entries 452. In the example illustrated in FIG. 4, the page profile entry 452 includes a Reserve or "R" field, an address (e.g., physical address) field, a Page-Table-Entry Content or PTE Content field, and a Status or "S" field. In one example, the "R" field indicates whether the entry is valid. In some examples, the "R" field indicates whether the entry and the rest of entries in the page profile list 450 are valid. In some examples, the "R" field indicates the end of the page profile list 450. In some examples, the address field includes the virtual address or guest physical address that meets the criteria identified in the page profile command 440 (e.g., Match Criteria Mask and Match Criteria Value). The PTE Content field includes the system physical address and associated page metadata in the page table structure 410 corresponding to the virtual address. The "S" field includes the status information (e.g., hot, cold, etc.) associated with the corresponding page.

In certain implementations, according to the match criteria, the profiling command 440 generates a list of entries meeting the match criteria. The page profile list 455 and 456 illustrates such list of entries. In one example, the page profile list 455 includes a list of hot memory pages in the second-tier memory, which has a slower memory access speed than the first-tier memory. In some variations, the page profile list 455 includes one or more profile entries 147. In some examples, the page profile entry 457 includes a Reserve or "R" field, an address (e.g., physical address) field, and a Page-Table-Entry Content or PTE Content field. In one example, the "R" field indicates whether the entry is valid. In some examples, the "R" field indicates whether the entry and the rest of entries in the page profile list 455 are valid. In some examples, the address field includes the virtual address or guest physical address that meets the criteria identified in the page profile command 440 (e.g., Match Criteria Mask and Match Criteria Value). In certain examples, the "R" field indicates the end of the page profile list 455. In some examples, the PTE Content field includes the system physical address and associated page metadata in the page table structure 410 corresponding to the virtual address.

In one example, the page profile list 456 includes a list of cold memory pages in the first-tier memory, which has a faster memory access speed than the second-tier memory. In some variations, the page profile list 456 includes one or more profile entries 148 In some examples, the page profile entry 458 includes a Reserve or "R" field, an address (e.g., physical address) field, and a Page-Table-Entry Content or PTE Content field, where the fields are same as the profile entry described above. In some examples, the page profile entry 458 includes a Reserve or "R" field, an address (e.g., physical address) field, and a Page-Table-Entry Content or PTE Content field. In one example, the "R" field indicates whether the entry is valid. In some examples, the "R" field indicates whether the entry and the rest of entries in the page profile list 456 are valid. In some examples, the address field includes the virtual address or guest physical address that meets the criteria identified in the page profile command 440 (e.g., Match Criteria Mask and Match Criteria Value). In certain examples, the "R" field indicates the end of the page profile list 456. In some examples, the PTE Content field includes the system physical address and associated page metadata in the page table structure 410 corresponding to the virtual address.

Figure 5:
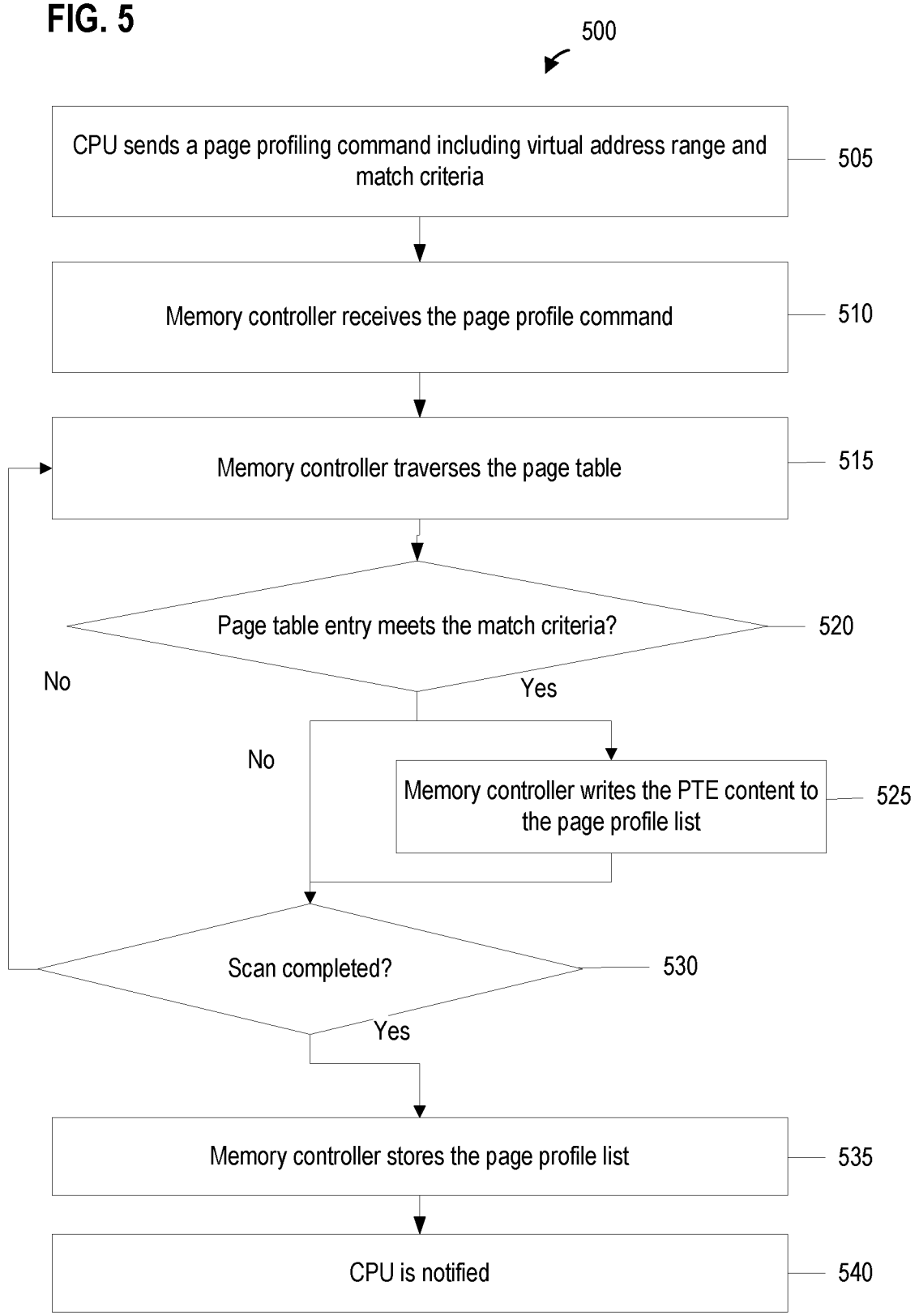
FIG. 5 is a flowchart illustrating one example of a method for offloading tiered memories management in accordance with certain implementations set forth in the disclosure.

FIG. 5 is a flowchart illustrating one example of a method 500 for offloading tiered memories management in accordance with certain implementations set forth in the disclosure. Aspects of the method 500 are performed, for example, by a computing device (e.g., a device implementing the computing system 100 in FIG. 1), a memory controller (e.g., an integrated memory controller, the DMA engine 130 in FIG. 1), a CPU (e.g., CPU 150 in FIG. 1). In some implementations, one or more steps of method 500 are optional and/or modified by one or more steps of other examples described herein. In some implementations, one or more steps of other examples described herein are added to the method 500. In some examples, CPU or a computing processor sends a page profiling command (e.g., profiling command 440 in FIG. 4), which includes virtual address range, match criterial, and other command information to a memory controller (505). In some examples, the page profiling command include a page table base address and a page profile list base address.

In certain implementations, the page profiling command includes requested page profile information including match criteria. For example, the match criteria specifies, the type of page list, for example, cold memory page list, hot memory page list, pages with access bit set, pages with access bit set for a predetermined profiling cycles, pages with access bit and dirty bit both set, pages with access bit set but dirty bit not set, and/or the like. In some examples, the requested page profile information includes page table range to scan, physical address range, and other information.

In some implementations, the memory controller (e.g., an integrated memory controller, a DMA engine/controller, etc.) receives the page profiling command (510), for example, to conduct page profiling to tiered memories. In some examples, the memory controller traverses the page table (515), to identify entries meeting the match criteria. In certain examples, the memory controller only scans valid page table entries, which can greatly reduce the number of entries to be scanned. In some examples, the memory controller scans the page table in a predetermined frequency. In one example, the memory controller scans the page table once with each profiling command received from the OS/HV of the CPU. In some variations, the memory controller scans the page table with a frequency higher than once per five (5) seconds, either based upon received profiling commands or based upon a predefined frequency. In some variations, the memory controller scans the page table with a frequency higher than once per one (1) second, either based upon received profiling commands or based upon a predefined frequency. In some implementations, the memory controller scans a part or all of the page table entries in the page table. In some variations, the memory controller reads the access bits and/or the dirty bits in the page table entries to determine whether a corresponding memory page is accessed and/or modified.

In some implementations, during the page table scan, for each page table entry, the memory controller determines whether the page table entry meets the match criteria (520). If the match criteria is met, the memory controller writes the PTE content of the page table entry to the page profile list (e.g., page profile list 450 in FIG. 4) (525). The memory controller determines whether the scan is completed (530), for example, for the page table range and physical address range specified in the page profiling command. If the scan is not completed, the memory controller continues to traverse the page table (515). If the scan is completed, the memory controller stores the page profile list (535), for example, at a specified memory location in the page profiling command. In some implementations, the CPU or the computing processor is notified (540), for example, via an interrupt, a memory location polling, or other notification approach.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. An integrated circuit comprising:
   a memory controller circuit operative to translate accesses to memory that are generated by one or more memory accessing agents, and in response to receiving a profiling command from a first processor, is configured to:
   obtain a pointer to a stored memory management structure associated with tiered memories, the stored memory management structure comprising a plurality of memory management entries, each memory management entry of the plurality of memory management entries comprising information for a memory section in one of the tiered memories;
   scan at least a part of the plurality of memory management entries;
   generate a memory profile list for the first processor, the memory profile list comprising a plurality of profile entries, each profile entry of the plurality of profile entries corresponding to a scanned memory management entry in the stored memory management structure; and
   wherein the profiling command comprises at least any one of the pointer to the stored memory management structure, a memory range of one of the tiered memories, and a match criteria.

2. The integrated circuit of claim 1, wherein the memory controller circuit is further configured to:
   scan at least a part of the plurality of memory management entries after receiving the profiling command and wherein the tiered memories include memories having different memory access speeds.

3. The integrated circuit of claim 1, wherein the match criteria comprises a criteria mask indicating a portion of each memory management entry of the plurality of memory management entries to be evaluated and a criteria value indicating a predetermined value of the portion of the memory management entry.

4. The integrated circuit of claim 3, wherein the portion of each memory management entry comprises at least one of an access bit and a dirty bit.

5. The integrated circuit of claim 1, wherein the memory profile list comprises a first list of one or more hot memory pages in a second-tier memory of the tiered memories that has a slower memory access speed than a first-tier memory of the tiered memories.

6. The integrated circuit of claim 5, wherein the memory profile list comprises a second list of one or more cold memory pages in the first-tier memory.

7. The integrated circuit of claim 6, wherein the memory controller circuit is further configured to:
   obtain a memory location for the memory profile list;
   store the memory profile list at the memory location; and
   transmit an indication of the memory profile list being generated for the first processor.

8. The integrated circuit of claim 7, wherein the memory controller circuit is further configured to:
   receive a move command; and
   migrate at least one hot memory page in the second-tier memory to the first-tier memory.

9. The integrated circuit of claim 1, wherein each profile entry of the plurality of profile entries comprises a memory management entry of a corresponding memory section.

10. The integrated circuit of claim 1, further comprising:
    the first processor, data fabric operatively coupled to the memory controller circuit;

and a second processor configured to interface with the tiered memories.

11. A system, comprising:

tiered memories, configured to store application data;

a processor configured to run an application; and a memory controller circuit operatively coupled to the tiered memories and operatively coupled to the processor that is configured to run the application, wherein the memory controller circuit is configured to:

receive a profiling command, from the processor;

receive a pointer to a page table from the processor, the page table comprising a plurality of page table entries, each page table entry comprising page information for a page in the tiered memories;

scan at least a part of the plurality of page table entries in the page table;

generate a page profile list for the processor in response to the profiling command, the page profile list comprising a plurality of profile entries, each profile entry of the plurality of profile entries corresponding to a scanned page table entry in the page table; and wherein the profiling command comprises at least any one of: the pointer to the page table, a memory range of one of the tiered memories, and a match criteria.

12. The system of claim 11, wherein the memory controller circuit is further configured to:

scan at least a part of the plurality of page table entries after receiving the profiling command.

13. The system of claim 11, wherein the match criteria comprises a criteria mask indicating a portion of each page table entry of the plurality of page table entries to be evaluated and a criteria value indicating a predetermined value of the portion of the page table entry.

14. The system of claim 13, wherein the portion of each memory management entry comprises at least one of an access bit and a dirty bit.

15. The system of claim 11, wherein the page profile list comprises a first list of one or more hot memory pages in a second-tier memory of the tiered memories that has a slower memory access speed than a first-tier memory of the tiered memories.

16. The system of claim 15, wherein the page profile list comprises a second list of one or more cold memory pages in the first-tier memory.

17. The system of claim 16, wherein the memory controller circuit is further configured to:

obtain a memory location for the page profile list; store the page profile list at the memory location; and transmit an indication of the page profile list being generated.

18. The system of claim 16, wherein the memory controller circuit is further configured to:

receive a move command; and migrate at least one hot memory page in the second-tier memory to the first-tier memory.

19. The system of claim 11, wherein each profile entry of the plurality of profile entries comprises a memory management entry of a corresponding memory section.

20. An integrated circuit comprising:

a memory controller circuit coupled to tiered memories and operative to translate accesses to memory that are generated by one or more memory accessing agents, and configured to:

process a profiling command to generate a memory profile list that is based on a stored memory management structure associated with the tiered memories, the stored memory management structure comprising a plurality of memory management entries, each memory management entry of the plurality of memory management entries comprising information for a memory section in one of the tiered memories;

scan at least a part of the plurality of memory management entries in response to the profiling command; and generate the memory profile list for a processor in response to the profiling command, the memory profile list comprising a plurality of profile entries, each profile entry of the plurality of profile entries corresponding to a scanned memory management entry in the stored memory management structure; and wherein the profiling command comprises a least any one of: a pointer to the stored memory management structure, a memory range of one of the tiered memories, and a match criteria.

21. The integrated circuit of claim 20, wherein the memory controller circuit is further configured to:

scan at least a part of the plurality of memory management entries after receiving the profiling command.

22. The integrated circuit of claim 20, wherein the match criteria comprises a criteria mask indicating a portion of each memory management entry of the plurality of memory management entries to be evaluated and a criteria value indicating a predetermined value of the portion of the memory management entry.

23. The integrated circuit of claim 22, wherein the portion of each memory management entry comprises at least one of an access bit and a dirty bit.

24. The integrated circuit of claim 20, wherein the memory controller circuit is further configured to:

obtain a memory location for the memory profile list; store the memory profile list at the memory location; and transmit an indication of the memory profile list being generated.

25. The integrated circuit of claim 24, wherein the memory controller circuit is further configured to:

receive a move command; and migrate at least one hot memory page in a second-tier memory to a first-tier memory.

* * * * *